US009100725B2

(12) United States Patent
Nam

(10) Patent No.: US 9,100,725 B2
(45) Date of Patent: Aug. 4, 2015

(54) METHOD AND APPARATUS FOR GENERATING MOVING PICTURE CLIP AND/OR DISPLAYING CONTENT FILE LIST, AND RECORDING MEDIUM STORING PROGRAM FOR EXECUTING THE METHOD

(71) Applicant: SAMSUNG ELECTRONICS CO., LTD., Suwon-si (KR)

(72) Inventor: Tae-wook Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/299,948

(22) Filed: Jun. 9, 2014

(65) Prior Publication Data

US 2014/0286622 A1    Sep. 25, 2014

Related U.S. Application Data

(60) Continuation of application No. 13/328,951, filed on Dec. 16, 2011, now Pat. No. 8,762,848, which is a division of application No. 11/511,305, filed on Aug. 29, 2006, now Pat. No. 8,082,503.

(30) Foreign Application Priority Data

Oct. 24, 2005    (KR) .................. 10-2005-0100280

(51) Int. Cl.
*H04N 21/8549*    (2011.01)
*G06F 3/00*    (2006.01)
(Continued)

(52) U.S. Cl.
CPC ............. *H04N 21/8549* (2013.01); *G06F 3/00* (2013.01); *G11B 27/005* (2013.01); *G11B 27/031* (2013.01); *G11B 27/322* (2013.01); *G11B 27/34* (2013.01); *H04N 5/783* (2013.01);
(Continued)

(58) Field of Classification Search
CPC .................................. G06F 3/00; G06F 3/048
USPC .................................................. 715/719, 720
See application file for complete search history.

(56) References Cited

U.S. PATENT DOCUMENTS 5,752,160 A *   5/1998  Dunn .............................. 725/93
2002/0181938 A1  12/2002  Tsumagari et al.
(Continued)

FOREIGN PATENT DOCUMENTS

CN    1520561 A    8/2004
CN    1538426 A    10/2004
(Continued)

OTHER PUBLICATIONS

Communication, dated Jul. 30, 2007, issued by the Korean Patent Office in counterpart Korean Application No. 10-2005-0100280.

*Primary Examiner* — Andrea Leggett
(74) *Attorney, Agent, or Firm* — Sughrue Mion, PLLC

(57) ABSTRACT

A recording and reproducing apparatus for displaying a content file list, a content file list displaying method and a recording medium storing a program performing the method, which are capable of easily identifying a paused content file and memorizing a point of the content file which reproducing is paused and content of the content file at the paused point, are provided. The method includes: determining whether or not a paused content file exists; creating a content file list capable of identifying the paused content file with reference to the result of the determination; and displaying the created content file list.

14 Claims, 9 Drawing Sheets

(51) Int. Cl.
    *G11B 27/32*     (2006.01)
    *G11B 27/34*     (2006.01)
    *H04N 5/783*     (2006.01)
    *G11B 27/00*     (2006.01)
    *G11B 27/031*     (2006.01)
    *H04N 9/87*     (2006.01)
    *G06F 3/048*     (2013.01)
    *H04N 9/82*     (2006.01)

(52) U.S. Cl.
    CPC .............. *H04N 9/87* (2013.01); *G06F 3/048* (2013.01); *H04N 9/8205* (2013.01); *H04N 9/8227* (2013.01)

(56) References Cited

U.S. PATENT DOCUMENTS

| | | | |
|---|---|---|---|
| 2003/0140350 A1* | 7/2003 | Watkins et al. | 725/116 |
| 2004/0008970 A1 | 1/2004 | Junkersfeld et al. | |
| 2005/0166258 A1 | 7/2005 | Vasilevsky et al. | |
| 2007/0065110 A1 | 3/2007 | Juen et al. | |
| 2008/0034306 A1* | 2/2008 | Ording | 715/764 |

FOREIGN PATENT DOCUMENTS

| | | |
|---|---|---|
| KR | 2003-0007736 A | 1/2003 |
| KR | 10-2004-0005111 A | 1/2004 |
| KR | 1020050017061 A | 2/2005 |
| KR | 10-2005-0049975 A | 5/2005 |

\* cited by examiner

METHOD AND APPARATUS FOR GENERATING MOVING PICTURE CLIP AND/OR DISPLAYING CONTENT FILE LIST, AND RECORDING MEDIUM STORING PROGRAM FOR EXECUTING THE METHOD

CROSS-REFERENCE TO RELATED PATENT APPLICATION

This application is a continuation of U.S. application Ser. No. 13/328,951, filed on Dec. 16, 2011, which is a Divisional of U.S. patent application Ser. No. 11/511,305, filed Aug. 29, 2006, which claims priority to Korean Patent Application No. 10-2005-0100280, filed on Oct. 24, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to a recording and reproducing apparatus, and more particularly, to a recording and reproducing apparatus for displaying a content file list, a content file list displaying method, and a computer-readable recording medium for storing a program for performing the method.

2. Description of the Related Art

Recently, due to the widespread use of recording and reproducing apparatuses with mass storage units, such as personal video recorders (PVR), a digital video express (DivX) player, and a portable multimedia player (PMP), a massive amount of content or a plurality of contents can be stored in the recording and reproducing apparatuses.

In general, these recording and reproducing apparatuses manage the stored contents as content files and display a list of the stored content files. In a related content file list displaying function, the content file list is displayed using text information such as titles of the content files as shown in FIG. 1A or using a thumbnail created by capturing scenes of the content files as shown in FIG. 1B. When the content file list is displayed, as shown in FIG. 1B, a captured scene is generally obtained by capturing the first scene of a content file.

Though a user can identify reproducible content files on the basis of the related content file list, the user cannot identify a content file which is paused during reproduction from among the reproducible content files. Therefore, when a user pauses a content file and wants to continue reproducing the content file, the user should memorize the corresponding content file item displayed in the content file list. For example, when "Immortal Admiral Lee Sun-Shin episode 12" is paused during reproduction, a user needs to remember the name of the item that was being reproduced, i.e., "Immortal Admiral Lee Sun-Shin episode 12", in order to continue reproducing the item.

However, when the stored content files are a massive content file which has been divided into a plurality of content files, or are a series of content files as shown in FIGS. 1A and 1B, it is difficult for a user to memorize the item corresponding to a paused content file, since items displayed in the content file list appear to be similar to each other.

Even if the user memorizes the item corresponding to the corresponding content file, it may take too much time to search for the point at which the content file was paused, because it is difficult for the user to memorize the contents of the paused point with reference to the previously provided content file list.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a recording and reproducing apparatus for displaying a content file list so as to easily identify the paused content file, a content file list displaying method and a computer-readable recording medium for recording a program performing the method.

The present invention also provides a recording and reproducing apparatus for displaying a content file list so as to remind a user of the paused point and the contents of the paused point, a content file list displaying method and a computer-readable recording medium for recording a program performing the method.

According to an aspect of the present invention, there is provided a content file list displaying method of a recording and reproducing apparatus with a storage unit for storing at least one content file, comprising: determining whether or not a paused content file exists; creating a content file list capable of identifying the paused content file with reference to the result of the determination; and displaying the created content file list.

According to another aspect of the present invention, there is provided a recording and reproducing apparatus for displaying a content file list, comprising: a storage unit for storing at least one content file and the data about the content file; a command input unit for inputting a user command; a content file list creation unit for creating the content file list which is capable of identifying the paused content file with reference to the data about the content file stored in the storage unit; a display unit for displaying the created content file list; and a control unit for controlling the storage unit, the content file list creation unit, and the display unit according to the command received from the command input unit; wherein the data about the content file includes a moving picture clip, and the moving picture clip is the moving picture clip of the paused content file.

According to another aspect of the present invention, there is provided a computer-readable recording medium for recording a program performing a content file list displaying method in a recording and reproducing apparatus, wherein the recording medium comprises: a code determining whether or not a paused content file exists; a code creating a content file list capable of identifying the paused content file with reference to the result of the determination; and a code displaying the created content file list.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Now, an exemplary embodiment according to the present invention will be described in detail with reference to the accompanying drawings.

Figure 1A:
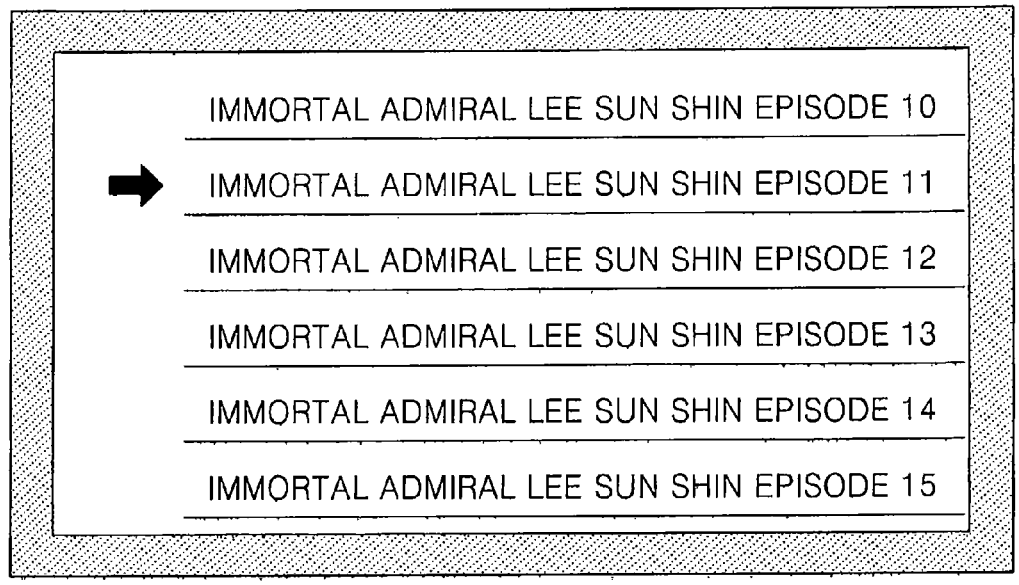
FIGS. 1A and 1B are views showing examples of a related content file list display.
Figure 1B:
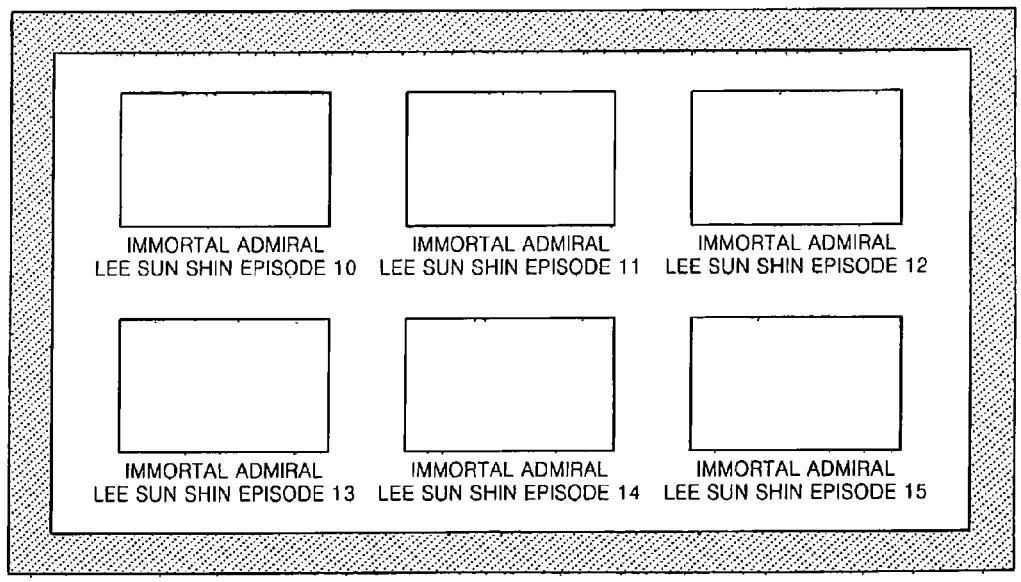
Figure 2:
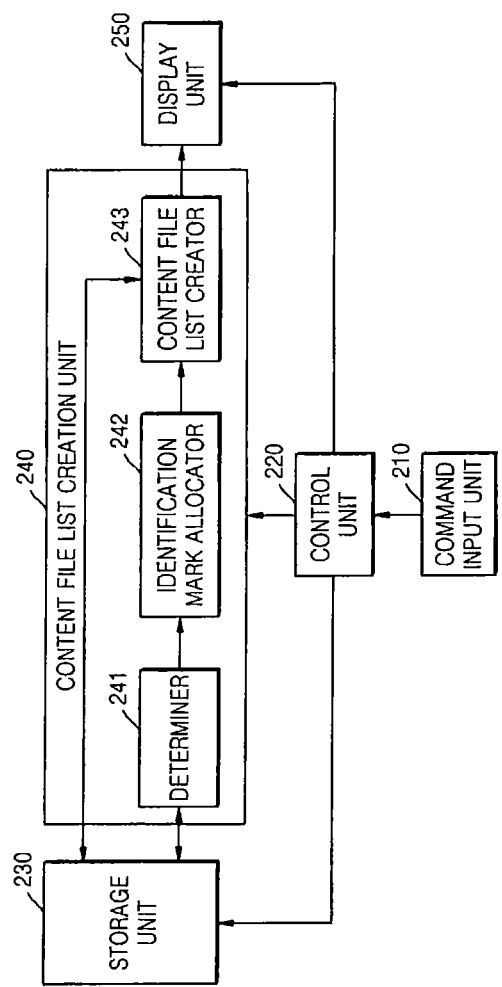
FIG. 2 is a functional block diagram showing a recording and reproducing apparatus for displaying a content file list according to an exemplary embodiment of the present invention.

FIG. 2 is a functional block diagram showing a recording and reproducing apparatus for displaying a content file list according to an exemplary embodiment of the present invention. The recording and reproducing apparatus may be a recording and reproducing apparatus with a mass storage unit, such as a personal video recorder (PVR), a digital video express (DivX) player, and a portable multimedia player (PMP). Referring to FIG. 2, the recording and reproducing apparatus includes a command input unit 210, a control unit 220, a storage unit 230, a content file list creation unit 240, and a display unit 250.

A user command is input into the command input unit 210. The user command may be a request for displaying a content file list, a request to terminate the displaying of the content file list, a request for cursor-setting on a content file list, a request for reproducing a content file, or a request for pausing a content file.

The control unit 220 controls the storage unit 230, the content file list creation unit 240, and the display unit 250 according to the command received from the command input unit 210.

The storage unit 230 stores at least one content file and data about the content file. The stored content files can be used to reproduce multimedia. The stored content files may be a plurality of the content files which a content file divides into, or a series of content files or a plurality of the content file which have no correlation each other.

The data about the stored content file may include list information about the content file, a moving picture clip, and a file system.

The list information about the content file may include text information and still picture data about the content file. The still picture data about the content file may be picture data captured from the content file or advertising picture data. When there is a moving picture clip corresponding to the content file, the still picture data may correspond to a first scene of the moving picture clip. The text information is information representing the contents of the content file, such as the title of the content file.

The moving picture clip of the paused content file consists of moving picture data during a specified time period just before the paused point.

The file system may include flag information expressing the existence or absence of a moving picture clip for a stored content file and connecting information connecting the content file to the moving picture clip. The connecting information may include position information about the storing position of the moving picture clip in the storage unit 230, and position information (or reproducing time information) about the picture data location corresponding to the moving picture clip in the content file.

A read mode and a write mode of the storage unit 230 are controlled by the control unit 220.

When it is required from the command input unit 210 to display the content file list, the content file list creation unit 240 reads the data about the content file controlled by the control unit 220 and stored in the storage unit 230 and creates the content file list capable of identifying the paused content file with reference to the data about the read content file.

As shown in FIG. 2, the content file list creation unit 240 includes a determiner 241, an identification mark allocator 242, and a content file list creator 243.

The determiner 241 determines whether or not a moving picture clip exists by reading the data about the content file stored in the storage unit 241. That is, for each content file, the determiner 241 can determine whether or not a moving picture clip exists with reference to the flag information expressing the existence or absence of a moving picture clip. The determiner 241 provides the result of the determination to the identification mark allocator 242.

Figure 3:
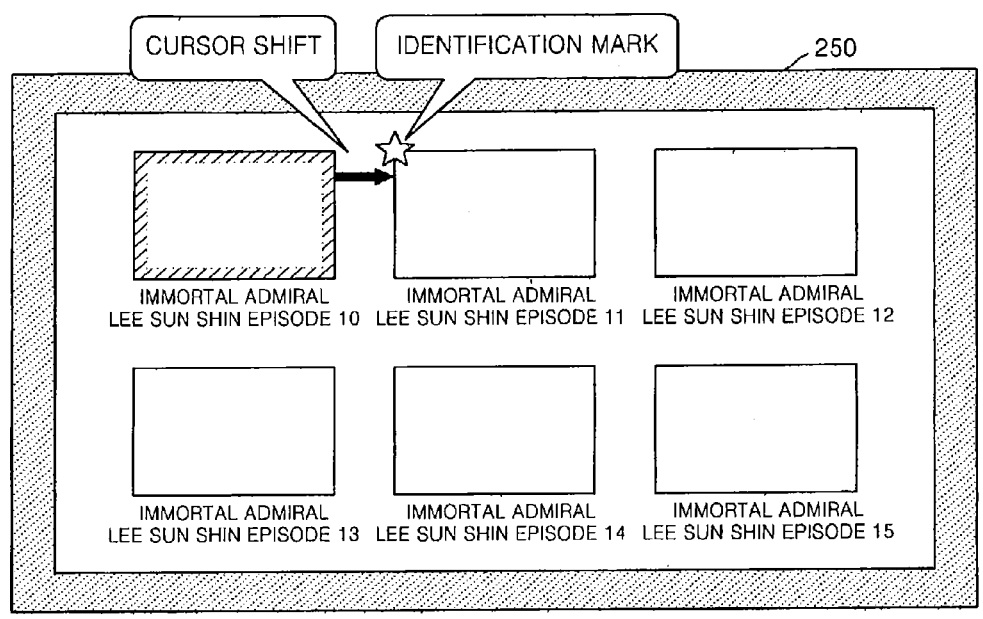
FIG. 3 is a view showing an example of the content file list displayed by the display unit shown in FIG. 2.

The identification mark allocator 242 allocates an identification mark to the paused content file with reference to the result of the determination of the determiner 241. As a result of the determination, when a content file having a moving picture clip does not exist, the identification mark allocator 242 does not allocate an identification mark to any content file. However, when at least one content file having a moving picture clip exists, the identification mark allocator 242 allocates an identification mark to the content file including the moving picture clip. As shown in FIG. 3, the identification mark may be represented with a star symbol "★". The identification mark is set previously.

The content file list creator 243 creates a content file list with reference to the information transmitted from the identification mark allocator 242 and the data about the content file read from the storage unit 230. The created content file list consists of still pictures to which the identification mark is allocated as shown in FIG. 3. In FIG. 3, the still picture data, which corresponds to the first scene of the moving picture clip, may be displayed in the case of the content file item allocated with the identification mark "★", that is, "Immortal Admiral Lee Sun Shin episode 11".

The display unit 250 displays the content file list created by the file list creation unit 240 as shown in FIG. 3. Particularly, the cursor shift among the content file items on the content file list can be displayed under the control of the control unit 220.

When the cursor set on the display unit 250 by the command input unit 210 shifts to the paused content file as shown in FIG. 3, the control unit 220 controls the content file list creation unit 240 and reproduces the moving picture clip corresponding to the paused content file.

Figure 4:
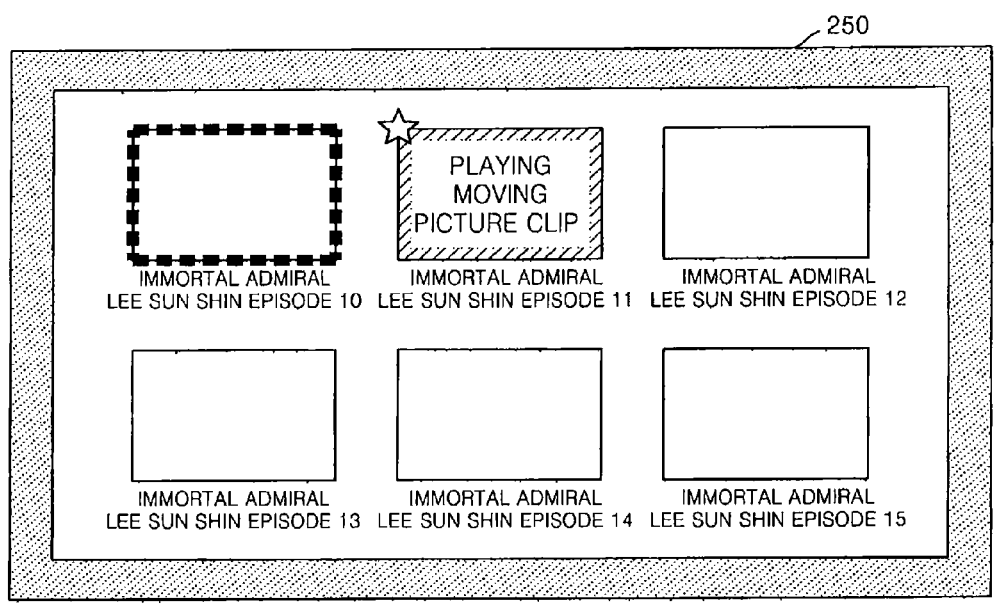
FIG. 4 is a view showing another example of the content file list displayed by the display unit shown in FIG. 2.

The content file list creator 243 of the content file list creation unit 240 reads the moving picture clip stored in the storage unit 230 with reference to the file system stored in the storage unit 230, and provides the displaying area of the corresponding content file item on the display unit 250 with the read moving picture clip so as to reproduce the moving picture clip. Accordingly, as shown in FIG. 4, the moving picture clip is reproduced in the display area of the corresponding content file item on the display unit 250. The reproduced moving picture clip may have a size of thumbnail. The moving picture clip is reproduced repeatedly while the cursor is set on the corresponding file item.

Figure 5:
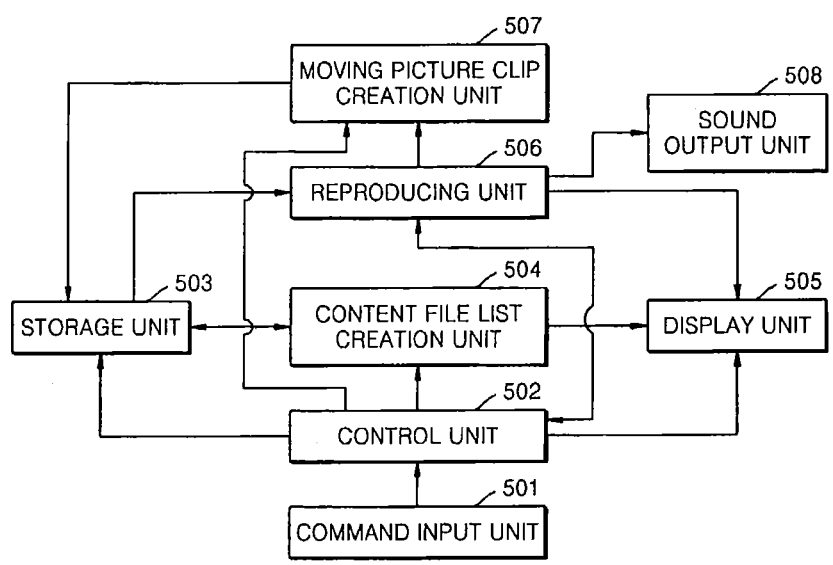
FIG. 5 is a functional block diagram showing a recording and reproducing apparatus for displaying a content file list according to another exemplary embodiment of the present invention.

FIG. 5 is a functional block diagram showing a recording and reproducing apparatus for displaying a content file list according to another exemplary embodiment of the present invention. Referring to FIG. 5, the recording and reproducing apparatus according to the present invention includes a command input unit 501, a control unit 502, a storage unit 503, a content file list creation unit 504, a display unit 505, a reproducing unit 506, a picture clip creation unit 507, and a sound output unit 508.

The command input unit 501, the storage unit 503, and the content file list creation unit 504 operate and are organized identically to the command input unit 210, the storage unit 230, and the content file list creation unit 240 in FIG. 2, respectively.

When it is requested to reproduce a content file from the command input unit 501, the reproducing unit 506 performs reproducing the content file requested to reproduce among the content files stored in the storage unit 503 under the control of the control unit 502. The reproducing unit 506 transmits the reproduced picture signal to the display unit 505, and displays the picture data of the corresponding contents. At this time, when the sound corresponding to the picture data exists, the sound output unit 508 outputs the sound of the corresponding contents.

When reproducing the content file is paused while the content file is reproduced, the control unit 502 determines whether the data reproduced in the reproducing unit 506 is the last part of the corresponding content file. The control unit 502 can determine whether or not the data of the currently reproduced contents includes the identification information expressing the last part of the contents. When a pause command is input into the command input unit 501 or reproducing the content file is completed, reproducing the content is paused.

As a result of the determination, when the currently reproduced data is the last part of the corresponding content file, the control unit 502 terminates a reproduce mode of the corresponding content file. When the currently reproduced data is not the last part of the corresponding content file by the result of the determination, the control unit 502 controls the moving picture clip creation unit 507 so as to create the moving picture clip corresponding to the corresponding content file.

The moving picture clip creation unit 507 receives the picture data or the picture data and the sound signal reproduced by the reproducing unit, and stores the data reproduced during the previously determined period in a first-in first-out manner. Then, when it is requested to create the moving picture clip by the control unit 502, the moving picture clip creation unit 507 creates the moving picture clip from the moving picture data or the moving picture data and the sound signal stored at the requested time, and transmits the moving clip to the storage unit 503. Accordingly, the storage unit 503 stores the moving picture clip. At this time, the moving picture clip creation unit 507 creates the information about the reproducing position of the moving picture clip in the corresponding content file, and transmits the information to the storage unit 503.

The moving picture clip stored in this way is reproduced on the created content file list by the content file list creation unit 504.

As shown in FIG. 4, when the cursor is set on the content file item paused during reproducing and the moving picture clip is reproduced, if a user requests to reproduce by using the command input unit 501, the control unit 502 reads the picture data or the picture data and the sound signal of the corresponding content file from the storage unit 503 by using the information about the moving picture clip stored in the storage unit 503, and reproduces the read content file through the reproducing unit 506.

That is, the control unit 502 controls the storage unit 503 and the reproducing unit 506 so as to reproduce the contents from the starting point by using the position information about the starting point of the moving picture clip stored in the storage unit 503 or to reproduce the corresponding content file from the point requested to create the moving picture clip by using the position information about the point requested to create the moving picture clip stored in the storage unit 503. In addition, the control unit 502 controls the storage unit 503 and the reproducing unit 506 so as to reproduce the content file from the start of the corresponding content file regardless of the moving picture clip.

The control unit 502 deletes the moving picture clip stored in the storage unit 503 when reproducing the corresponding content file is completed. If the moving picture clip is deleted, when the display unit 505 displays the content file list thereafter, the identification mark is not allocated to the corresponding content file and the still picture data displayed in the content file list becomes a still picture data set up with default regardless of the moving picture clip.

On the other hand, when reproducing the corresponding content file is paused again after creating the first moving picture clip, the control unit 502 creates the moving picture clip file with reference to the paused position as described above, and updates the moving picture clip stored in the storage unit 503 to a newly created moving picture clip.

In addition, the recording and reproducing apparatus for displaying the content file list may be organized so that the control unit 220 and 502 may include the content file list creation unit 240 and 504.

Figure 6:
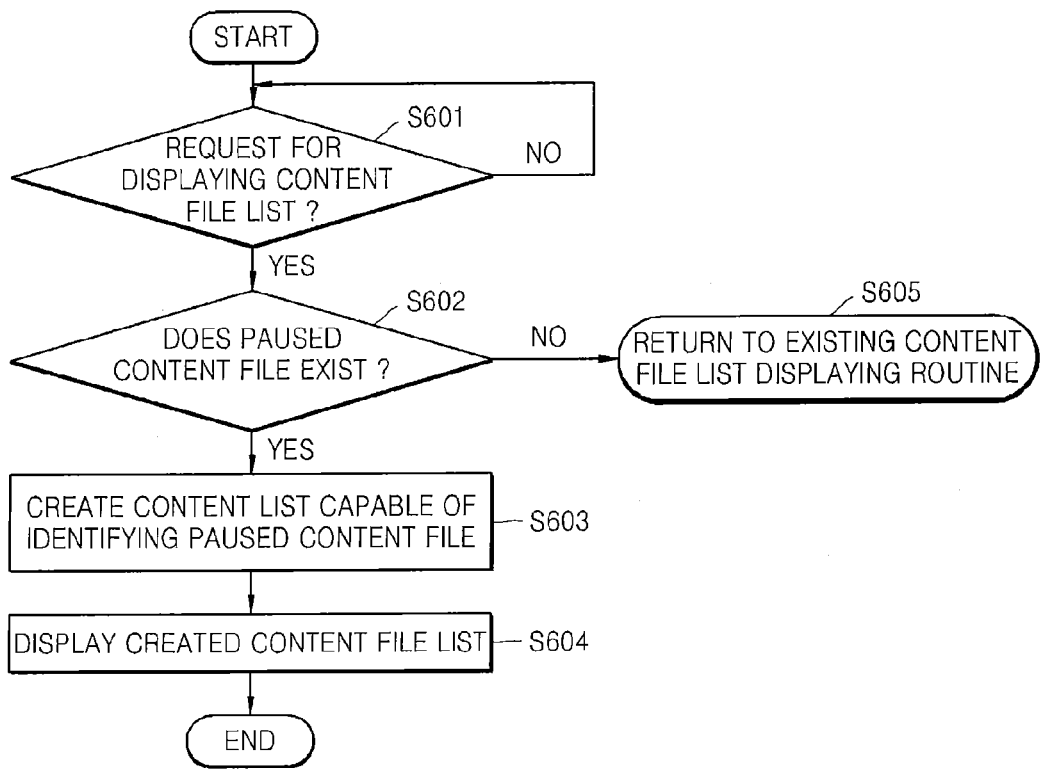
FIG. 6 is a flow chart showing a content file list displaying method according to an exemplary embodiment of the present invention.

FIG. 6 is a flow chart showing a content file list displaying method according to another exemplary embodiment of the present invention.

When it is requested to display the content file list by a user using the recording and reproducing apparatus (S601), determine whether the paused content file exist among the content files stored in the storage unit 230 and 503 of the recording and reproducing apparatus (S602). That is, determine whether or not the content file with the moving picture clip exists among the content files stored in the storage unit 230 and 503. The existence or absence of the moving picture clip is as explained in FIG. 2.

Figure 7:
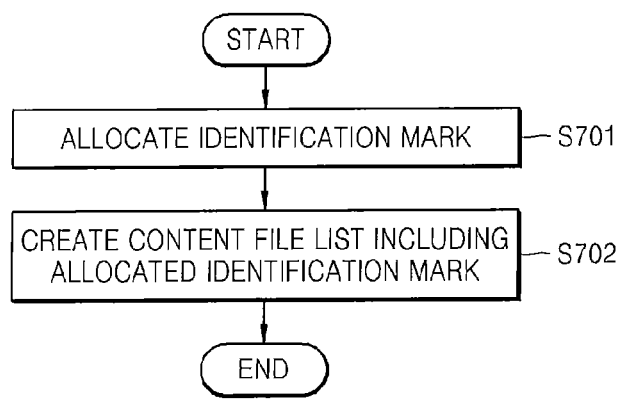
FIG. 7 is a detailed flow chart showing an operation for creating the content file list shown in FIG. 6.

The recording and reproducing apparatus creates the content file list capable of identifying the paused content file with reference to the result of the determination (S603). The content file list is created as shown in FIG. 7. FIG. 7 is a detailed flow chart showing an operation of creating the content file list shown in FIG. 6.

Referring to FIG. 7, an identification mark is allocated to the paused content file with reference to the result of the determination (S701). The content file list including the allocated identification mark is created (S702). Allocating of the identification mark is as explained in FIG. 2.

The recording and reproducing apparatus displays the created content file list on the display unit 250 and 505 (S604).

On the other hand, when the recording and reproducing apparatus determines that the paused content file does not exist among the content files stored in the recording and reproducing apparatus, the recording and reproducing apparatus proceeds to the existing content file list displaying routine (S605).

Figure 8A:
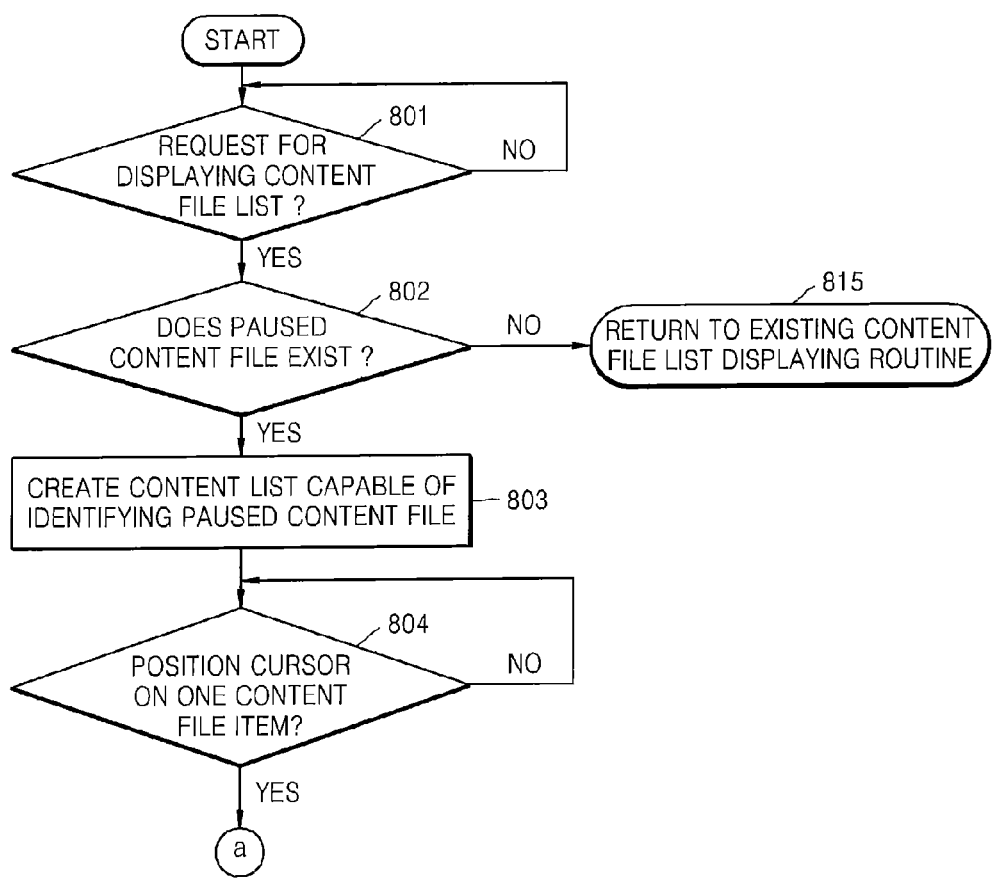
FIGS. 8A and 8B are a flow chart showing a content file list displaying method according to another exemplary embodiment of the present invention.
Figure 8B:
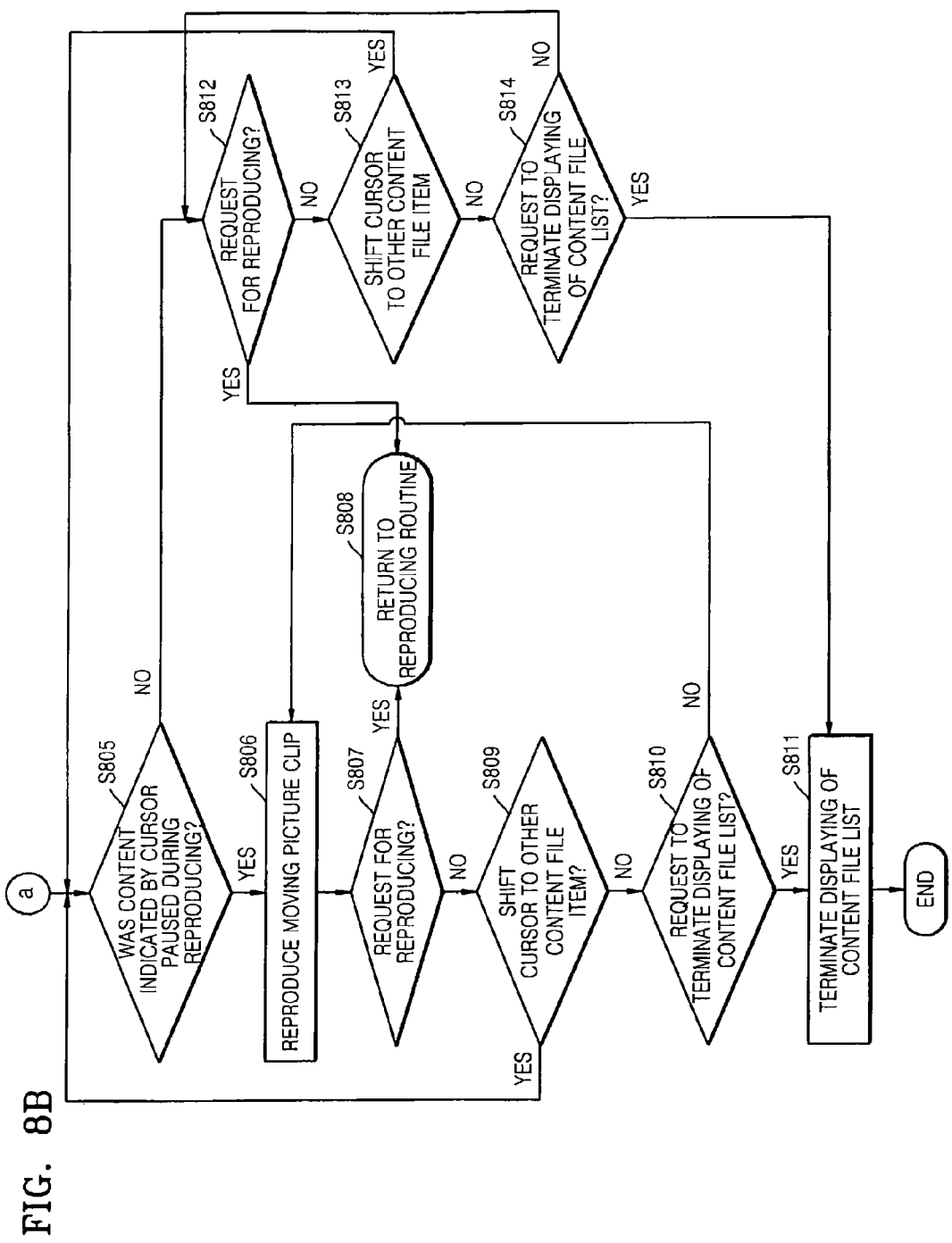

FIG. 8 is a flow chart showing a content file list displaying method according to another exemplary embodiment of the present invention.

When a user requests the recording and reproducing apparatus to display the content file list (S801), it is determined whether the paused content file exists among the content files stored in the storage unit 230 and 503 of the recording and reproducing apparatus (S802). The determination is performed identically to operation S601 in FIG. 6.

The recording and reproducing apparatus creates the content file list capable of identifying the paused content file with reference to the result of the determination, and displays the created content file list (S803).

When the cursor is set on one content file item while displaying the content file list, the recording and reproducing apparatus determines whether the cursor positioned content file item is the paused content file (S804 and S805). As a result of the determination, when the cursor positioned content file item is the paused content file, the recording and reproducing apparatus reproduces the corresponding moving picture clip (S805 and S806).

The recording and reproducing apparatus proceeds to the reproducing routine when it is requested to reproduce while reproducing the moving picture clip (S807 and S808).

However, when it is not requested to reproduce while reproducing the moving picture clip, the recording and reproducing apparatus determines whether the cursor shifts to another content file item on the content file list (S807 and S809). When the cursor does not shift to another content file item, the recording and reproducing apparatus determines whether it is requested to terminate displaying the content file list by a user (S809 and S810).

When it is not requested to terminate displaying the content file list by a user, the recording and reproducing apparatus continue to reproduce the moving picture clip (S810 and S806). At this time, when the cursor does not shift to another content file item, the recording and reproducing apparatus is reproducing the moving picture clip repeatedly. However, when it is requested to terminate displaying the content file list by a user, the recording and reproducing apparatus terminates displaying the content file list and terminate the operation (S810 and S811).

On the other hand, when the cursor shifts to another content file item, the recording and reproducing apparatus returns to operation S805 and determine whether the cursor positioned content file is the paused content file (S809 and S805).

In operation S805, when the cursor positioned content file item isn't the paused content file, the recording and reproducing apparatus determines whether it is requested to reproduce by a user (S805 and S812).

When it is requested to reproduce by a user, the recording and reproducing apparatus proceeds to the reproducing routine about the cursor positioned content file (S812 and S808).

However, when it is not requested to reproduce the cursor positioned content file, the recording and reproducing apparatus determines whether the cursor shifts to another content file item (S812 and S813). When the cursor shifts to another content file item, the operation of the recording and reproducing apparatus returns to operation 805 (S813 and S805). However, when the cursor does not shift to another content file item, the recording and reproducing apparatus determines whether it is requested to terminate displaying the content file list by a user (S814). When it is requested to terminate displaying the content file list by the user, the recording and reproducing apparatus terminates displaying the content file list and terminate the operation (S814 and S811). When it is not requested to terminate displaying the content file list, the operation of the recording and reproducing apparatus returns to operation S812.

Figure 9:
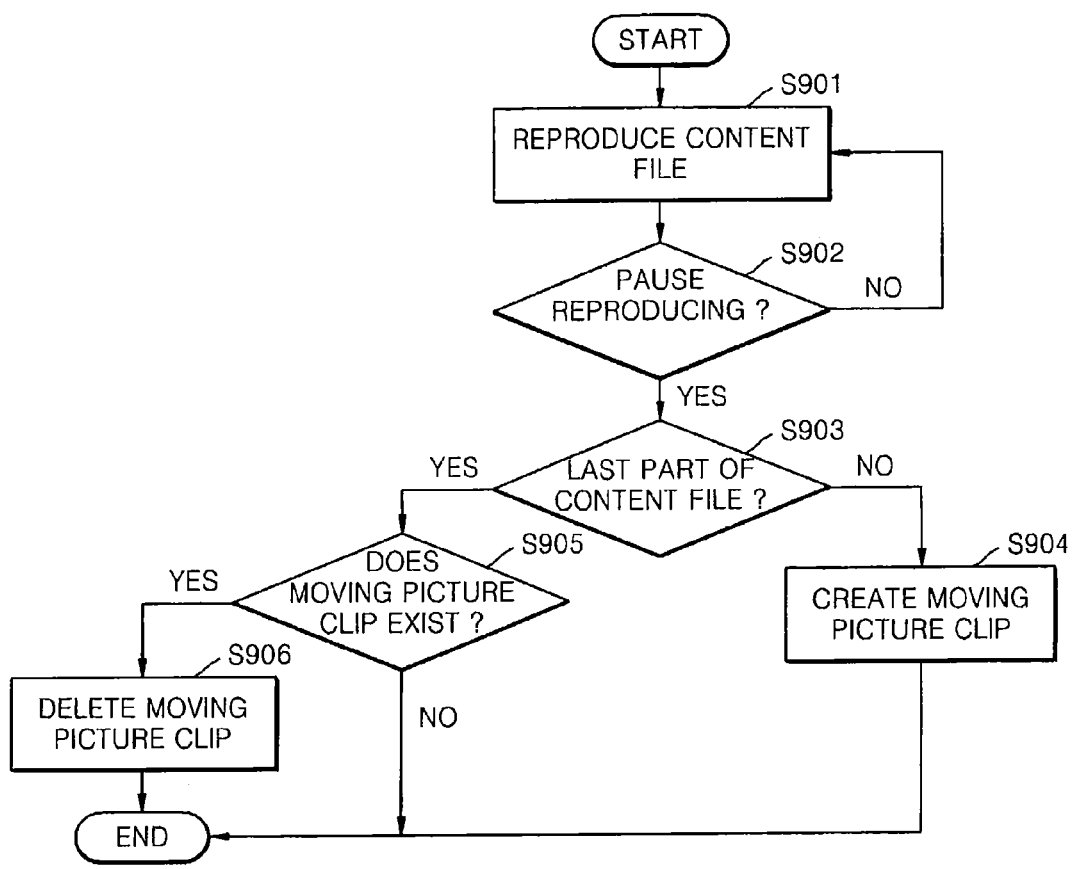
FIG. 9 is a flow chart showing operations for creating and deleting a moving picture clip used in displaying the content file list.

FIG. 9 is a flow chart showing operations of creating and deleting the moving picture clip used in displaying the content file list.

When reproducing a content file, when reproducing the content file is paused, the recording and reproducing apparatus determines whether the currently reproduced part is the last part of the content file (S901, S902, and S903). At this time, reproducing the content file is paused by inputting a pause command into the command input unit 210 and 501 or by reproducing the last part of the content file.

When the currently reproduced part is not the last part of the content file, the recording and reproducing apparatus creates the moving picture clip of the currently reproduced content file (S903 and S904). Creating the moving picture clip is as explained in FIG. 5. The created moving picture clip is stored in the storage unit 230 and 503.

However, when the currently reproduced part is the last part of the content file, the recording and reproducing apparatus determines whether or not the moving picture clip of the corresponding content file exists in the storage unit 230 and 503 (S903 and S905). The determination of the existence or absence of the moving picture clip is performed as explained in FIG. 2. When the moving picture clip exists in the storage unit 230 and 503, the recording and reproducing apparatus deletes the moving picture clip in the storage unit 230 and 503 and terminates the reproduce mode (S905 and S906). However, when the moving picture clip does not exist in the storage unit 230 and 503, the recording and reproducing apparatus terminates the reproduce mode of the corresponding content file (S905).

FIGS. 6 to 9 are performed by system control unit in the recording and reproducing apparatus.

The invention can also be embodied as computer readable codes on a computer readable recording medium in another exemplary embodiment. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to an exemplary embodiment of the present invention, when displaying the reproducible content file list, if the paused content file exists, by allocating a identification mark to the corresponding content file item, a user can easily identify the paused content file with reference to the content file list.

In addition, according to an exemplary embodiment of the present invention, when displaying the reproducible content file list, by displaying the still picture or by reproducing the moving picture clip with reference to the paused point, a user can easily memorize the paused point and the contents of the paused point and search the paused point.

While the present invention has been particularly shown and described with reference to exemplary embodiments thereof, it will be understood by those skilled in the art that various changes in form and details may be made therein without departing from the spirit and scope of the invention as defined by the appended claims. Particularly, in the above described exemplary embodiments, if it is requested to display the content file list, the content file list is created. Alternatively, after creating the content file list according to the present invention regardless of the request by a user, the created content file list may be displayed according to the request for displaying the content file list by a user. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for displaying a content file list, the method comprising:
   determining whether at least one paused content file exists;
   in response to the determining that the at least one paused content file exists, generating a content file list configured to identify the at least one paused content file, wherein the at least one paused content file is distinguishably displayed from other content files on the content file list by at least one of an identification mark and moving picture viewable during a specified time period; and
   displaying the generated content file list.

2. The method of claim 1, further comprising generating a moving picture clip which displays the moving picture using the paused content file from a predetermined time to a point at which reproduction of the paused content file is paused.

3. The method of claim 2, wherein the specified time period corresponds to time period between the predetermined time to the point at which reproduction of the paused content file is paused.

4. The method of claim 2, further comprising storing position information regarding a point at which reproduction is stopped.

5. The method of claim 2, further comprising generating the moving picture clip when a cursor is positioned on the paused content file.

6. The method of claim 1, wherein the moving picture is repeatedly viewable.

7. The method of claim 6, wherein the moving picture is repeatedly viewable while a cursor is positioned on the paused content file.

8. An apparatus for displaying a content file list, the apparatus comprising:
   a determiner, including a processor and a memory, configured to determine whether at least one paused content file exists;
   a content file list creator configured to generate, in response to the determination that the at least one paused content file exists, a content file list configured to identify the at least one paused content file, wherein the at least one paused content file is distinguishably displayed from other content files on the content file list by at least one of an identification mark and moving picture viewable during a specified time period; and
   a display configured to display the generated content file list.

9. The apparatus of claim 8, wherein the content file list creator is further configured to generate a moving picture clip which displays the moving picture using the paused content file from a predetermined time to a point at which reproduction of the paused content file is paused.

10. The apparatus of claim 9, wherein the specified time period corresponds to time period between the predetermined time to the point at which reproduction of the paused content file is paused.

11. The apparatus of claim 9, further comprising a storage configured to store position information regarding a point at which reproduction is stopped.

12. The apparatus of claim 9, wherein the content file list creator is configured to generate the moving picture clip when a cursor is positioned on the paused content file.

13. The apparatus of claim 8, wherein the moving picture is repeatedly viewable.

14. The apparatus of claim 13, wherein the moving picture is repeatedly viewable while a cursor is positioned on the paused content file.

* * * * *